United States Patent [19]

Orlando et al.

[11] Patent Number: 5,184,973
[45] Date of Patent: Feb. 9, 1993

[54] FISH SKINNER

[75] Inventors: Franklin P. Orlando; Thomas Franco, both of Morgan Hill, Calif.

[73] Assignee: Star Kist Foods, Inc., Long Beach, Calif.

[21] Appl. No.: 481,198

[22] Filed: Feb. 20, 1990

[51] Int. Cl.⁵ .......................... A22C 25/17
[52] U.S. Cl. ................................ 452/125
[58] Field of Search ........... 17/50, 62, 21; 452/125

[56] References Cited

U.S. PATENT DOCUMENTS

| | | | |
|---|---|---|---|
| 2,020,579 | 11/1935 | Schlothan | 452/125 |
| 3,513,893 | 5/1970 | Townsend | 452/127 |
| 3,806,616 | 4/1974 | Mencacci et al. | 17/50 |
| 4,606,094 | 8/1986 | Evich | 452/125 |
| 4,756,030 | 8/1988 | Dubowik | 4/192 |
| 4,793,026 | 12/1988 | Braeger et al. | 452/127 |
| 4,811,462 | 3/1989 | Meyn | 452/134 |
| 4,882,811 | 11/1989 | Ewing | 17/58 |

*Primary Examiner*—Willis Little
*Attorney, Agent, or Firm*—Burns, Doane, Swecker & Mathis

[57] ABSTRACT

A process and apparatus for descaling tuna fish and the like wherein the fish is at least partially cooked and then cooled to a backbone temperature of about 70° to 100° F. The fish is placed on a conveyor and passed through horizontally and vertically disposed brushes. Jets of water are sprayed on the fish at the point of contact of the fish and the brushes to thereby wash away the scales and skin as removed by the brushes.

19 Claims, 2 Drawing Sheets

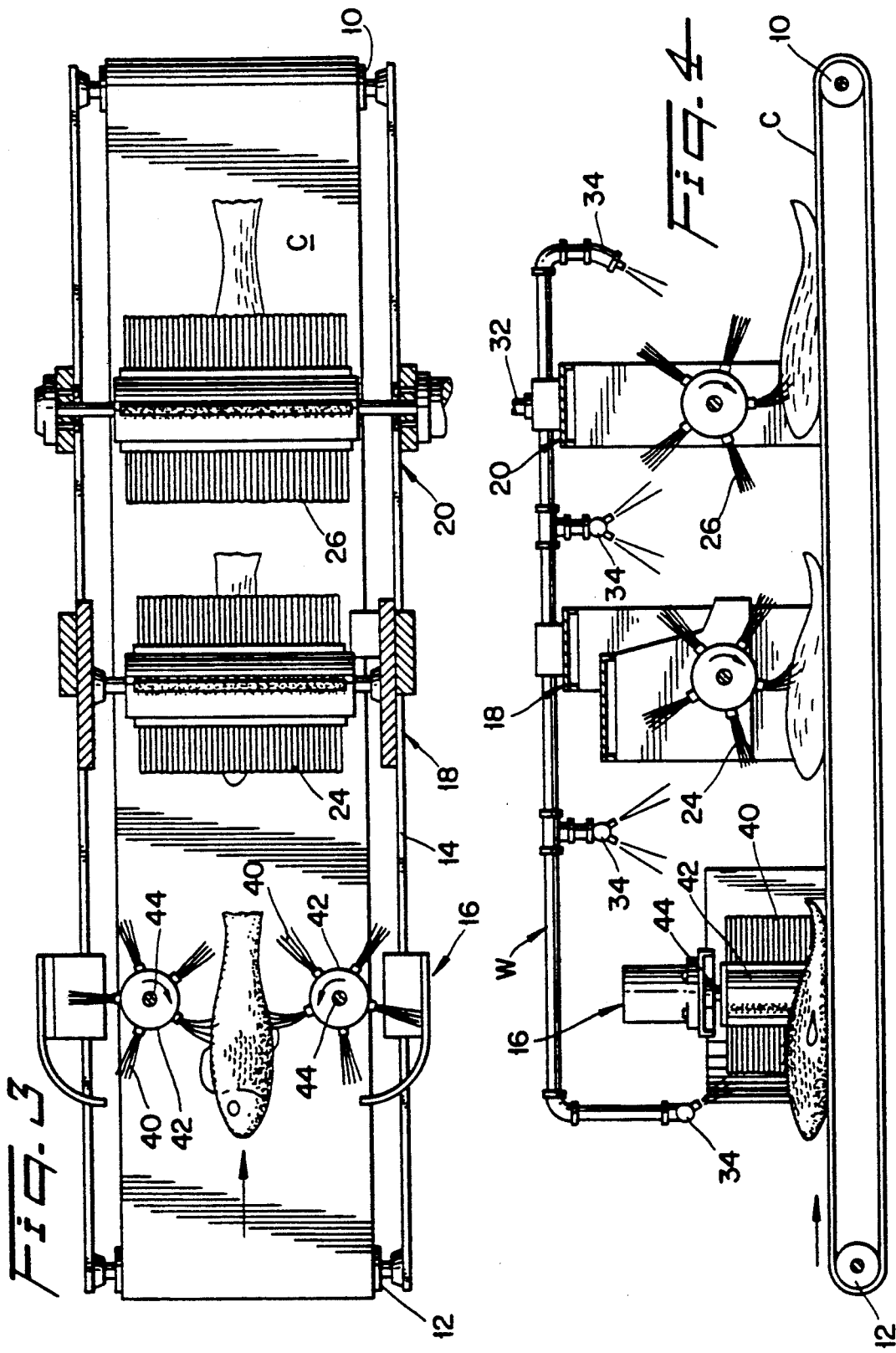

FISH SKINNER

BACKGROUND OF THE INVENTION

1. Field of the Invention

This invention relates to a method and apparatus for removing the skin from fish, particularly tuna fish, during the processing thereof prior to canning, further cooking, or the like.

2. Prior Art

The process and apparatus of the present invention have been found very useful in that they represent an inexpensive and satisfactory system for skinning tuna fish. This is in sharp contrast to the many types of commercial fish skinner equipment and systems that have been used heretofore and which comprise various combinations of abrasive or cutting devices. For example, one system uses a frozen fish as thawed, and thereafter skinned, by water jets. Chemical peeling to disintegrate and loosen the skin has also been used to remove the skin. These methods are not only complicated and expensive, but many of them do not work satisfactorily on tuna fish.

SUMMARY OF THE INVENTION

By the invention, the fish is precooked or otherwise treated by subjecting it to hot steam or hot water sprays, and the like, so that the skin and immediately underlying flesh is softened. Such treatment has the effect of softening the skin and the adjacent flesh. The fish is then placed on a horizontal conveyor belt and passed under a series of rotating brushes, mounted on vertical and horizontal axes. The brushes are placed so that the sides of their bristles make contact with the fish and remove the fish skin and disturb little if any of the meat immediately adjacent to the outer upper skin of the fish. In the case of tuna, each side of the fish is separately treated as by turning over each fish after a pass and subjecting the opposite side to a similar treatment to remove the skin therefrom.

DESCRIPTION OF THE DRAWING

A more complete understanding can be had by reference to the accompanying drawings wherein:

FIG. 3 is a top plan view of the vertical and horizontal brush arrangements and the conveyor belt of the invention.

FIG. 4 is a horizontal elevational view, partly in section, of the essential parts of the conveyor, the brushes and overhead water sprays.

DESCRIPTION OF THE PREFERRED EMBODIMENTS

Figure 1:
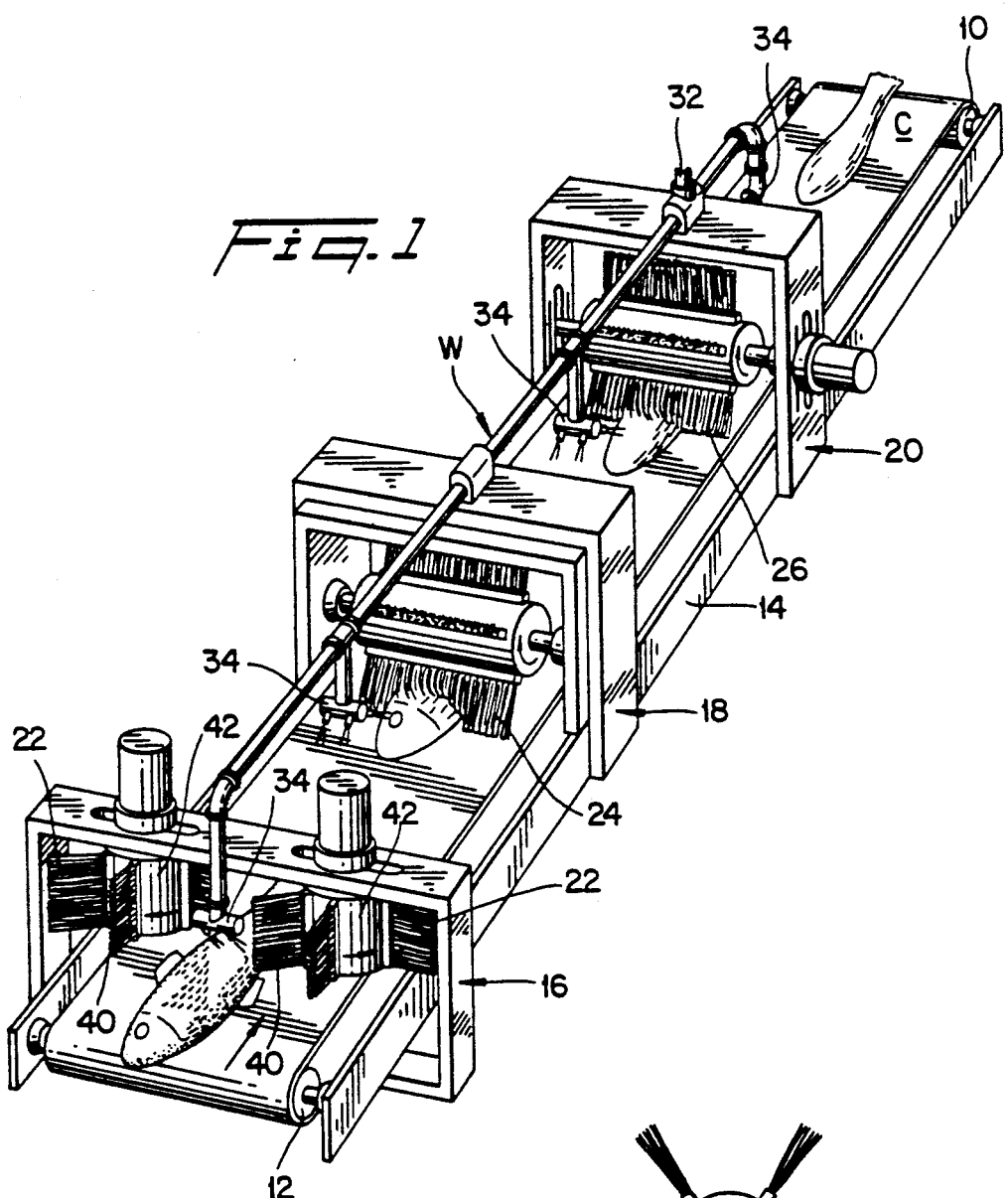
FIG. 1 is a perspective view of the conveyor, skin scraping brushes and water spray apparatus of the invention showing fish being processed.
Figure 2:
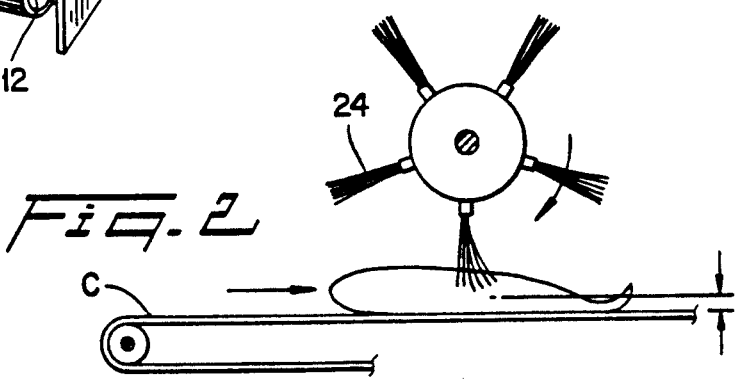
FIG. 2 is a fragmentary horizontal view, partly in section, of one of the horizontal brushes and its location with respect to the conveyor belt.

It will be noted from the drawings, particularly FIG. 1, that the essential parts of the apparatus of the invention comprise the conveyor belt C, the brush assemblies mounted at 16, 18 and 20, and the water spray system W.

Conveyor belt C is horizontally disposed and supported on rollers 10 and 12, which in turn are mounted on support frame 14 at opposite ends of the machine and are activated by conventional motors not shown. As can be seen from the drawings, stations or locations 16, 18 and 20, respectively, for supporting the brush arrangements of the invention, are located at various points along belt C and are in turn also supported by frame 14.

The mount 16 supports the set of vertical brushes 22 and are arranged to contact the upper and lower parts of the fish when it is passed between them.

FIGS. 1, 3 and 4 show the vertical brush assembly 22 wherein a pair of vertical brush arrangements 40 are used at a single station 16. Each brush arrangement or assembly has several strip brushes 40 which are of the paddle type and are secured to metal hubs 42. Hubs 42 are secured to parallel vertical shafts 44. Each vertical shaft 44 is powered with an appropriate conventional hydraulic motor to control the rotating speed thereof.

As will be noted from FIG. 1, the brushes therein are of the horizontal type identified as 24 and 26. The brushes are also of the paddle type having strip brushes mounted radially around a metal hub, desirably aluminum. As in the vertical brushes, the hubs are secured to a shaft which is driven by conventional power means not shown. However, the brushes 24 and 26 are mounted horizontally across belt C at stations 18 and 20, respectively. As in the case of the vertical brushes, it is important that the speed of the brush be controlled by the use of a conventional hydraulic motor or the like.

The water spray system W is connected to and mounted adjacent or on brush support systems 16, 18, and 20. System W includes an inlet tube 32 at the top of system W and a plurality of outlet sprays 34 which are adapted to propel pressurized water sprays onto the fish that is being skinned. The sprays are directed to the area where the bristles contact the fish.

It is to be noted that the brush arrangement 16 is comprises of a pair of vertically disposed brushes which otherwise are similar to the brushes at stations 18 and 20.

In operation, a fish is placed, advantageously tail-first, on conveyor C and advances with the traveling belt and is contacted with the bristles of the rotating brushes. In this instance, the first contact is with the vertical brushes. The brushes rotate in a direction opposite to the travel of the fish and, in view of their length, drag along the body of the fish so that the bristles contact the body of the fish and readily remove the skin therefrom. The sprays from the overhead water sprays of the wash system W, as heretofore stated, contact the fish at the area of contact with the bristles and wash away the skin that is removed by the brushing step. In the skinning operation shown herein, the fish advantageously first passes on conveyor C in the vertical brushes and then into the two horizontally disposed brushing systems 18 and 20 which remove the scales and skin from the exposed part of the fish.

The fish, after completing its passage through the skinning system, may then be turned over and placed tail-first on the end of the belt which is then reversed, along with the rotation of the brushes, and the fish is sent back through the system with the water sprays applied at the point of contact of the brushes, and thus the scales are removed from all sides of the fish. In lieu of the foregoing, the fish may simply be turned over and sent through the system from the original starting point so that the belt direction and brush rotation are unchanged. Both arrangements are satisfactory for removing the scales from all parts of the fish.

As heretofore stated, the fish are precooked, desirably in atmospheric steam, so that the skin and adjacent flesh are softened and are cooked at least to that point. However, prior to putting them through the spray system, they are cooled by water spray and the like to a backbone temperature of 70° F. to 100° F. and preferably within a temperature range of 80° F. to 90° F. for most desirable results.

The precooked and cooled fish, which is placed on the conveyor belt, is advantageously moved at a speed of one-half inches per second, that being the speed of the conveyor belt, toward the rotating brushes. The clearance between the moving conveyor and the rotating horizontal brush is approximately 1.5 inches and is rotated at about 120 r.p.m. in a direction that advances into the moving brush. The vertical brush is rotated at about 96 r.p.m. The effect is to gently remove the skin from the fish with minimal damage to the underlying flesh of the fish. While the foregoing is being conducted, water is sprayed at the fish-brush interface and loosened skin is washed therefrom so that one or more passes through the brush will remove the tuna skin. The brush speeds can be varied to suit the requirements of the fish to be treated.

As heretofore stated, a feature of this invention is that the contact of the brush in a manner wherein it wraps around the fish and removes the skin on the side, belly and back, is useful and does a particularly good job without disturbing the thin, tender belly meat and the flesh is left clean without need for touch-up or clean-up by hand. Also, the brush is of a length and a flexibility that the bristle side thereof rubs against the fish in contrast to the tip thereof, and the effect is to produce the gentle scraping action that has been found so effective to remove the skin without disturbing the underlying cooked flesh.

We claim:

1. A process for skinning tuna fish and the like comprising:
   precooking the fish,
   cooling said precooked fish until the backbone temperature thereof falls within the range of 70° F. to 100° F.,
   placing said precooked and cooled fish in a conveying means moving toward a series of rotating brush assemblies, each of said brush assemblies including a plurality of flexible brushes,
   passing said fish between the conveying means and said rotating brush assemblies so that sides of the flexible brushes contact and conform to the fish and remove skin from the side, belly and back of each said fish without tearing the belly meat of each said fish,
   spraying water at the fish-brush interface to wash away loosened skin,
   and thereafter recovering the clean fish.

2. The process of claim 1 wherein the fish is placed on a conveyor belt and, in a tail-first position, the brushes on the rotating brush assemblies contact the skin thereof to remove the skin with minimal damage to the underlying flesh on the fish.

3. The process of claim 1 wherein the backbone temperature of said precooked fish is subjected to water spray to reduce the temperature thereof to within the range of 80° F. to 90° F.

4. The process of claim 1 wherein said belt conveyor moves at about 6 inches per second toward said rotating brush assemblies.

5. The process of claim 1 wherein said brush assemblies rotate at approximately 120 revolutions per minute in a direction to advance into the moving fish on said belt conveyor.

6. The process according to claim 1, wherein said series of rotating brush assemblies includes at least one horizontally disposed brush assembly and at least one vertically disposed brush assembly, and including the step of rotating the at least one horizontally disposed brush assembly at a speed, in revolutions per minute, that is greater than the speed at which the at least one vertically disposed brush assembly is rotatably driven.

7. Apparatus for skinning fish to be further processed for canning and the like comprising a conveying means for receiving fish and moving the same toward rotating brush assemblies that include a pair of vertically disposed brush assemblies mounted above said conveying means and arranged to make contact with said fish, and separate horizontally disposed brush assemblies, each mounted on a horizontal axis and adapted to rotate in a direction opposite to that of said conveying means, said horizontally disposed brush assemblies being spaced from one another and from said vertically disposed brush assemblies along said conveying means, said horizontally disposed brush assemblies and said vertically disposed brush assemblies being comprised of flexible brushes having a length and flexibility sufficient to allow sides of the brushes to contact, rub against and conform to the fish when the fish passes between the conveying means and the horizontally disposed brush assemblies and between the vertically disposed brush assemblies so that skin is removed from the fish while substantially minimal damage occurs to flesh underlying the skin.

8. The apparatus of claim 7 wherein water spray means are mounted adjacent to each skin removal brush for sending high pressure jets of water at each said brush at the point of skin removal to wash away the skin scraped from said fish.

9. The apparatus according to claim 7, wherein said horizontally disposed brush assemblies rotate at a faster speed, in revolutions per minute, than the vertically disposed brush assemblies.

10. A process for skinning fish, comprising the steps of:
    precooking the fish;
    cooling said precooked fish;
    transporting said cooled fish by way of a conveying means toward an arrangement of rotating brush assemblies, each of said brush assemblies including a plurality of flexible brushes;
    removing skin from the fish by contacting the fish with sides of the flexible brushes such that the sides of the flexible brushes rub against and conform to the fish and so that substantially minimal damage occurs to flesh underlying the skin;
    spraying the fish to wash away ski that has been removed from the fish by way of contact with the sides of the brushes; and
    thereafter recovering the fish.

11. The process according to claim 10, wherein said arrangement of brush assemblies includes a plurality of successively arranged substantially horizontal brush assemblies, said step of removing skin from the fish including successively passing the fish between the conveying means and the substantially horizontally arranged brush assemblies.

12. The process according to claim 10, wherein said arrangement of brushes includes at least one pair of substantially vertically disposed brush assemblies, said step of removing skin including passing the fish between the pair of substantially vertically arranged brush assemblies.

13. The process according to claim 10, wherein the fish is transported in a direction opposite to the direction of rotation of the brush assemblies.

14. The process according to claim 10, wherein said precooked fish is cooled to a backbone temperature of between 70° F. and 100° F.

15. An apparatus for removing skin from fish, comprising: a plurality of rotatably driven brush assemblies and transporting means for receiving and conveying fish toward and past the brush assemblies, said brush assemblies overlying the transporting means so that fish pass between the brush assemblies and the transporting means, each of said rotatably driven brush assemblies including a plurality of flexible brushes so that sides of the flexible brushes contact, rub against and conform to the fish when the fish passes between the flexible brushes and the transporting means to thereby remove skin form the fish while substantially minimal damage occurs to flesh underlying the skin.

16. The apparatus according to claim 15, including means for spraying water on the fish in the area where the sides of the flexible brushes contact the fish.

17. The apparatus according to claim 15, wherein said brush assemblies are rotatably driven in a direction opposite to the direction in which the transporting means conveys the fish.

18. The apparatus according to claim 15, wherein said plurality of brush assemblies includes two substantially vertically arranged brush assemblies and at least one substantially horizontally arranged brush assembly.

19. The apparatus according to claim 15, wherein said transport means conveys the fish in a fish conveyance direction, said two substantially vertically oriented brush assemblies being located upstream of the at least one substantially horizontally disposed brush assembly with respect to the fish conveyance direction.

* * * * *